Figure 1:
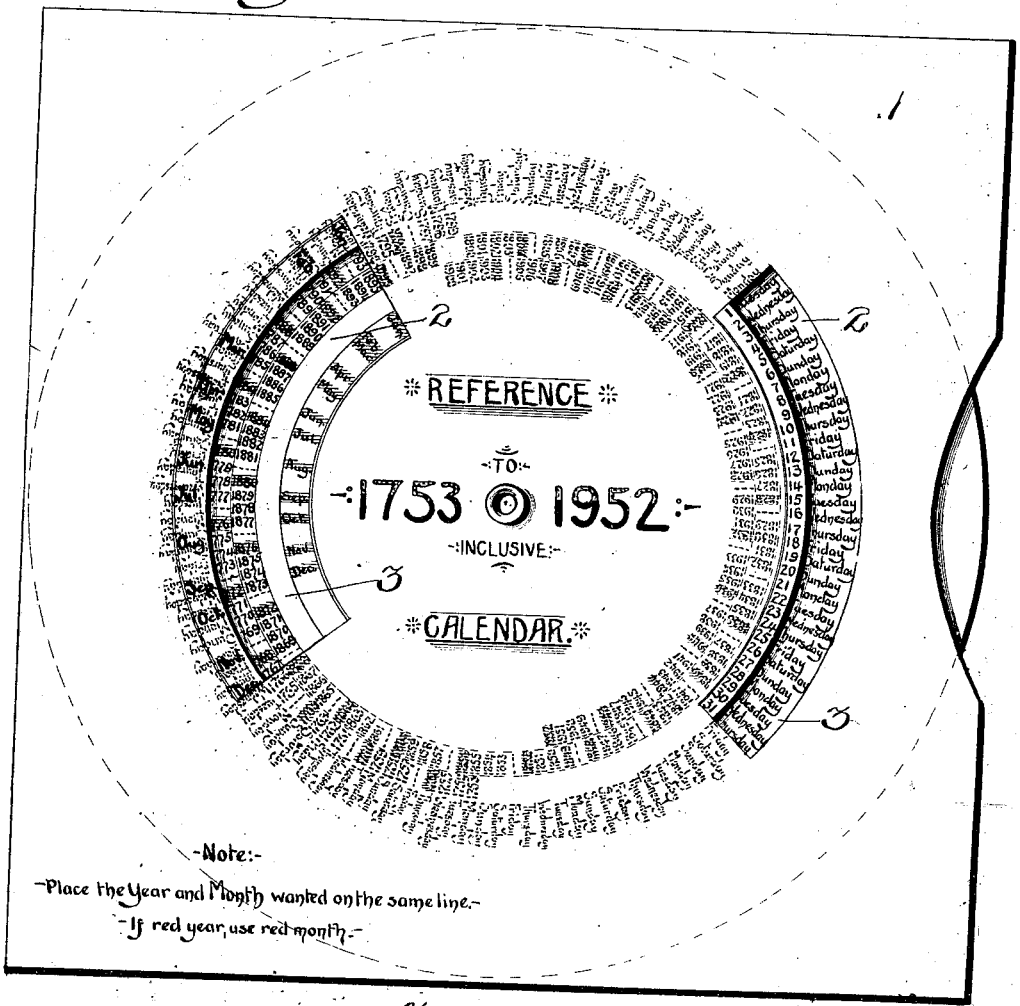

No. 658,309. Patented Sept. 18, 1900.
A. ZACHRISSON.
CALENDAR.
(Application filed Nov. 7, 1899.)
(No Model.) 5 Sheets—Sheet 1.

Witnesses:
Horace G. Peitz
H. Joseph Doyle

Adolf Zachrisson,— Inventor,
By Marion Marion
his Attorneys.

No. 658,309. Patented Sept. 18, 1900.
A. ZACHRISSON.
CALENDAR.
(Application filed Nov. 7, 1899.)

(No Model.) 5 Sheets—Sheet 2.

Witnesses:
Horace G. Seitz
H. Joseph Doyle

Adolf Zachrisson, Inventor,
By Marion & Marion
his Attorneys.

No. 658,309. Patented Sept. 18, 1900.
A. ZACHRISSON.
CALENDAR.
(Application filed Nov. 7, 1899.)
(No Model.) 5 Sheets—Sheet 3.
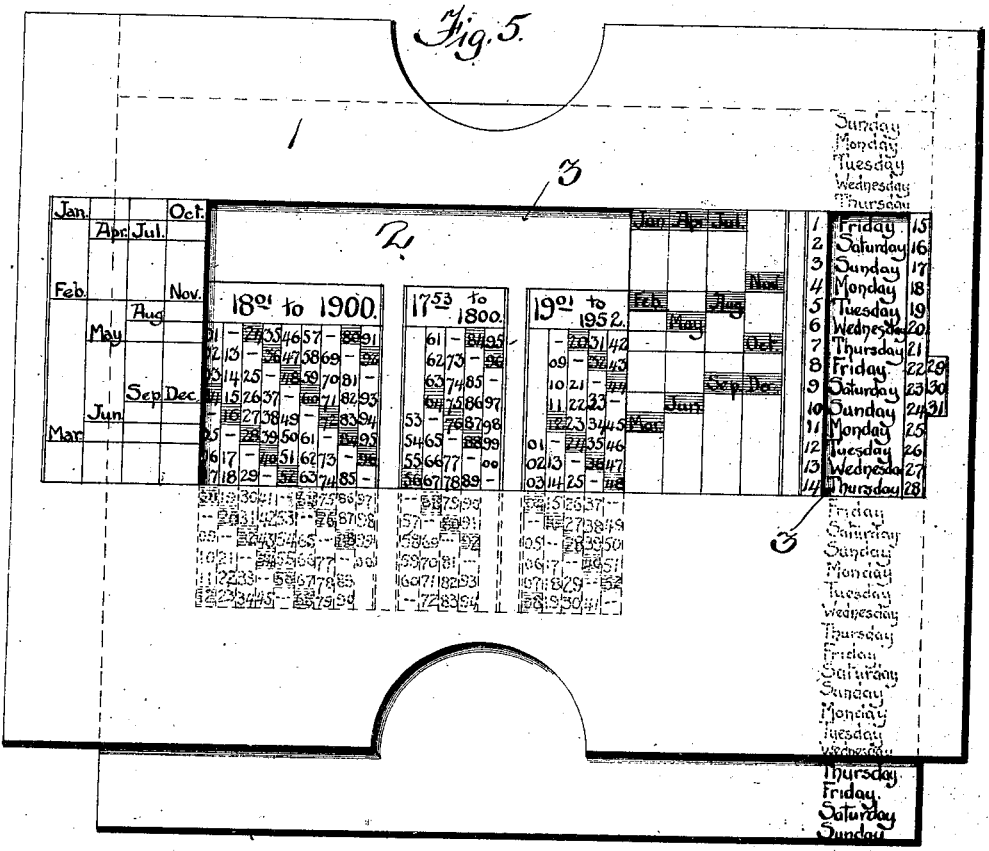
Fig. 5.
Fig. 6.
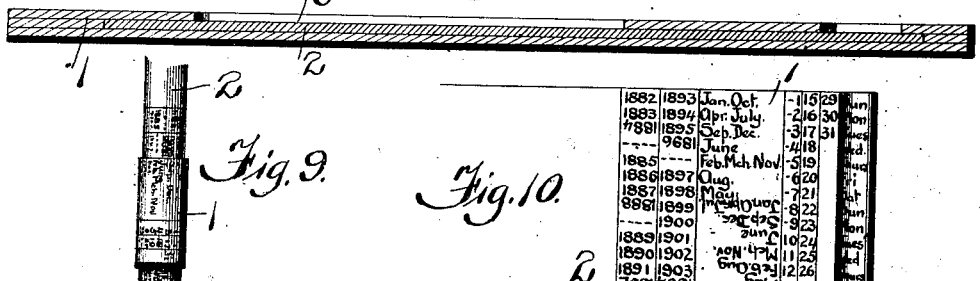
Fig. 9. Fig. 10.
Witnesses:
Horace G. Deitz
H. Joseph Doyle
Adolf Zachrisson   Inventor,
By Marion & Marion
his Attorneys.

No. 658,309.  
A. ZACHRISSON.  
CALENDAR.  
(Application filed Nov. 7, 1899.)  
Patented Sept. 18, 1900.
(No Model.)
5 Sheets—Sheet 4.
Fig. 7.
Fig. 8.
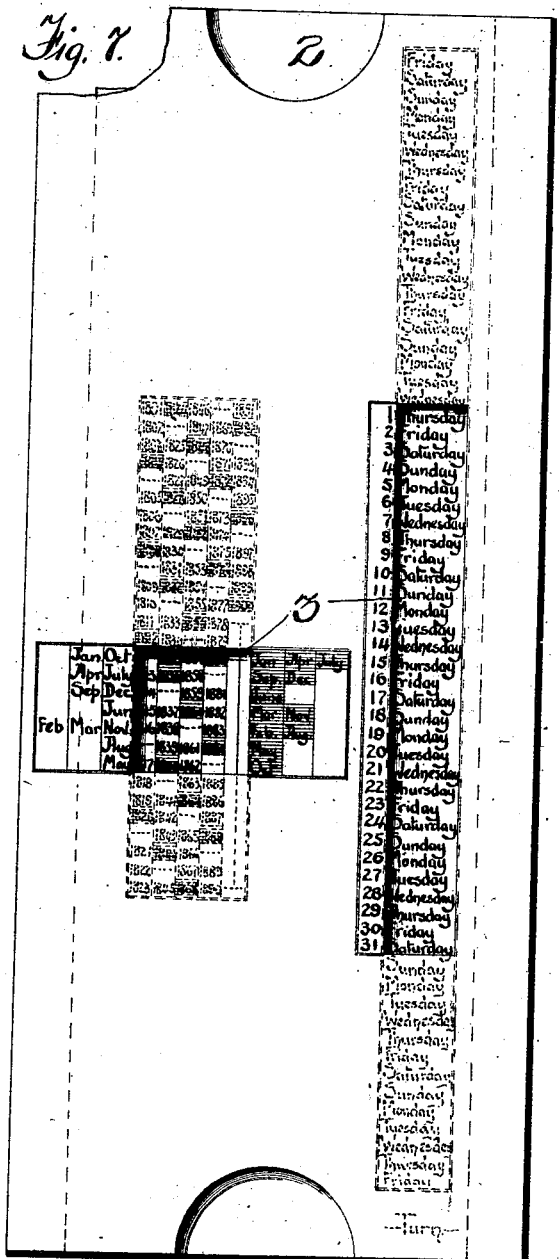
Witnesses:  
Horace G. Deitz  
H. Joseph Doyle
Adolf Zachrisson, Inventor  
By Marion & Marion  
his Attorneys No. 658,309. Patented Sept. 18, 1900.
A. ZACHRISSON.
CALENDAR.
(Application filed Nov. 7, 1899.)

(No Model.) 5 Sheets—Sheet 5.

Witnesses: Adolf Zachrisson, Inventor,
By Marion & Marion
his Attorneys.

UNITED STATES PATENT OFFICE.

ADOLF ZACHRISSON, OF PERTH CENTRE, CANADA.

CALENDAR.

SPECIFICATION forming part of Letters Patent No. 658,309, dated September 18, 1900.

Application filed November 7, 1899. Serial No. 736,170. (No model.)

*To all whom it may concern:*

Be it known that I, ADOLF ZACHRISSON, a subject of the King of Sweden and Norway, (but having made oath as to my intention to become a citizen of the United States,) residing at Perth Centre, county of Victoria, Province of New Brunswick, Canada, have invented certain new and useful Improvements in Calendars; and I do hereby declare that the following is a full, clear, and exact description of the invention, such as will enable others skilled in the art to which it appertains to make and use the same.

My invention has relation to calendars, and has particular relation to improvements in the class of devices known as "universal" or "perpetual" calendars.

One object of my invention is to provide a device of this character with a minimum number of members movable relatively to each other and in which the user is enabled to find the day of the week or the date in the month without the use of calculations, being required only to know the year and month of the required day or date to enable the proper setting of the members relatively to each other.

A further object is to provide a construction in which the years are arranged in sequential order, including the leap-years, which latter are arranged distinctive, said arrangement coacting with the two independent series of months, one series being for use with ordinary years, the other series being adapted for use with the leap-years, said latter series having the same distinctive features as the leap-year.

A further object is to provide a construction in which the year and days of the week are arranged on one member, both in sequence, the remaining member carrying the months and the dates in the month, said members being movable relatively to each other.

A further object is to provide a construction in which the years are arranged in periods, including a leap-year, said periods being arranged in sequential series.

A further object is to provide a construction which is neat and attractive in appearance, durable in construction, simple and efficient in operation, and which can be made at a low cost.

To these and other ends, the nature of which will be clearly perceived as the invention is hereinafter described, said invention consists in the improved construction, combination, and arrangement of parts, as hereinafter fully described, illustrated in the accompanying drawings, forming a part of this specification, and particularly pointed out in the appended claims.

Figure 2:
Figure 3:
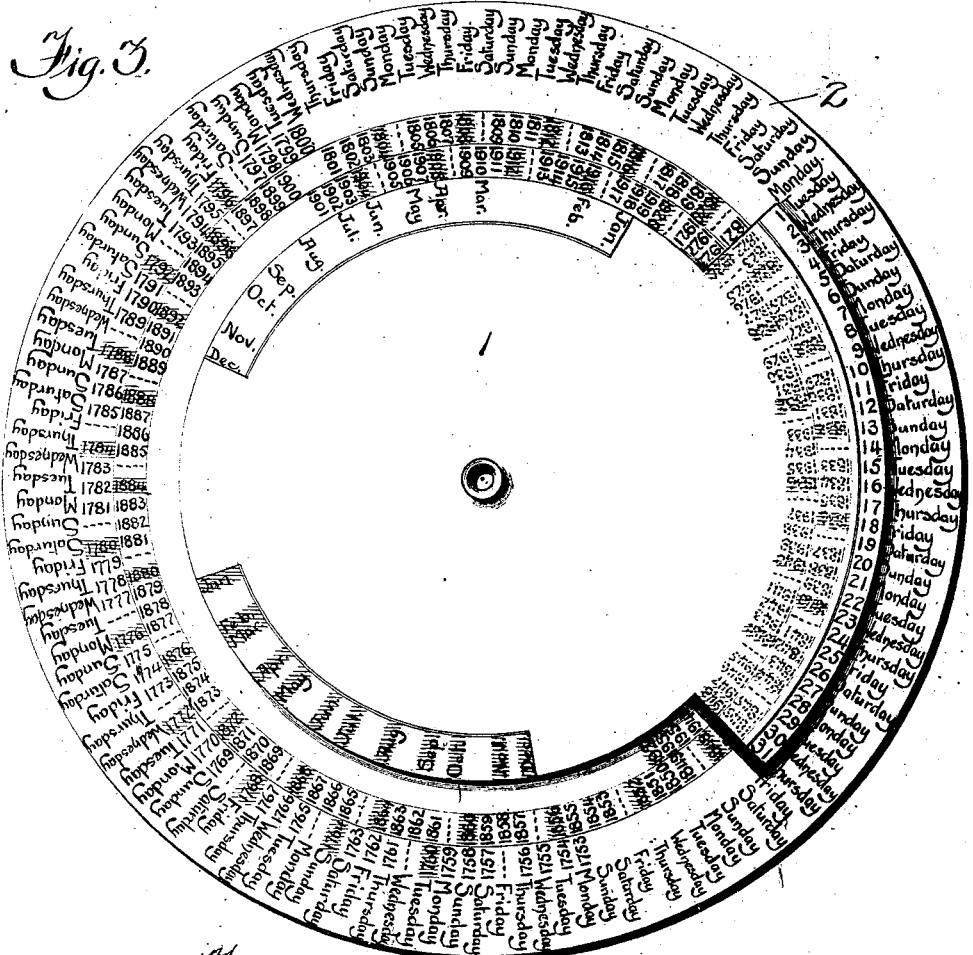
Figure 4:
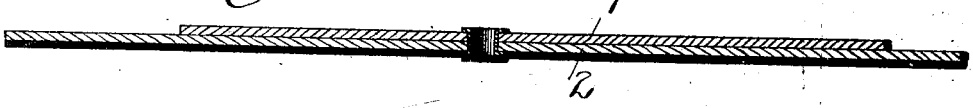
Figure 11:
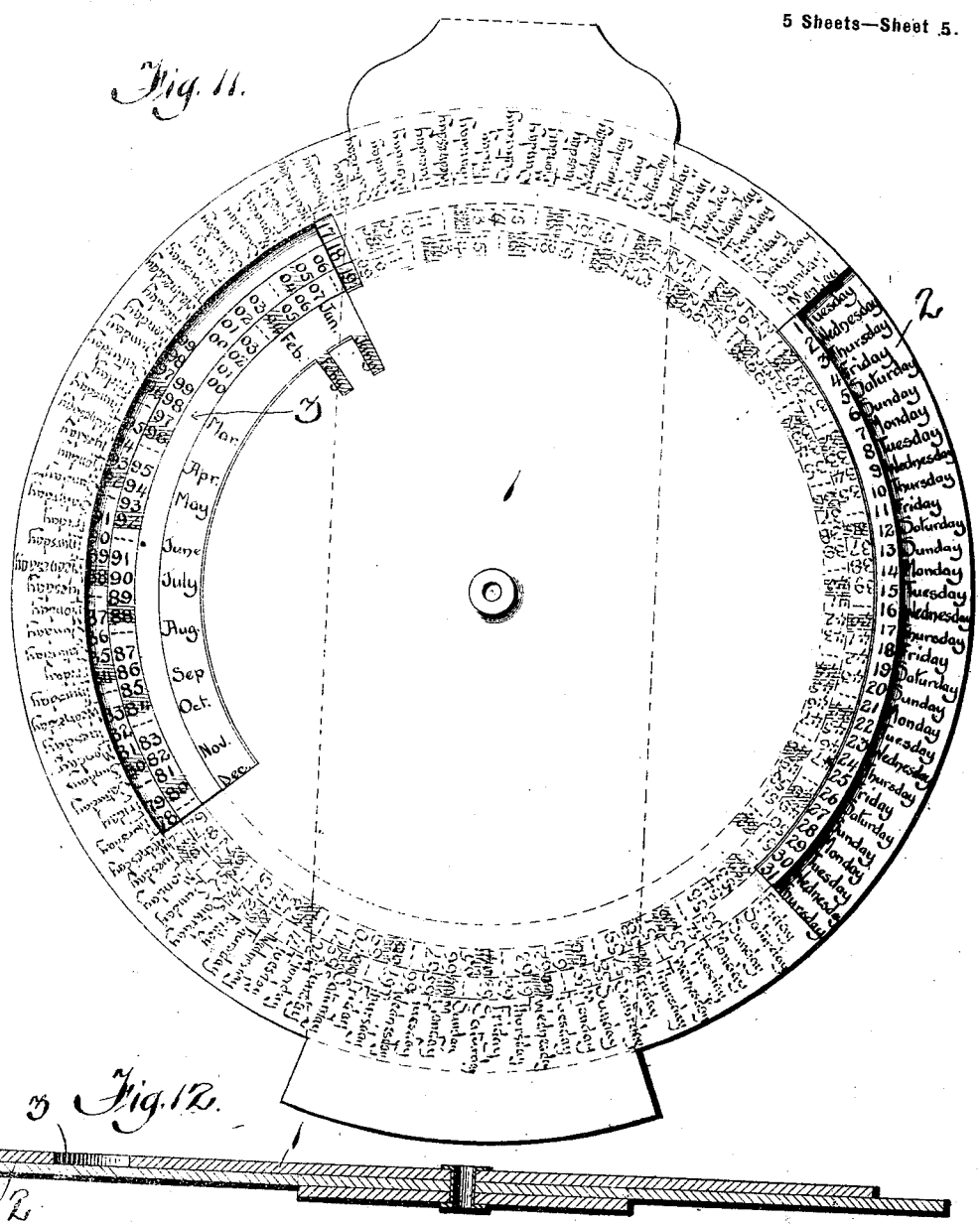
Figure 12:
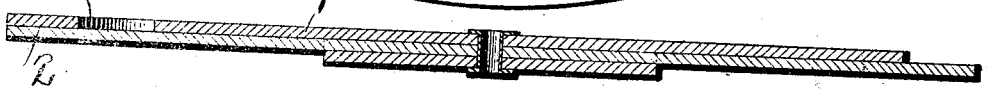

In the drawings, in which similar reference characters indicate similar parts in all of the views, Figure 1 is a face view of one form of the calendar, showing the members as pivotally connected, the upper member being provided with slots to expose certain portions of the lower member. Fig. 2 is a central cross-sectional view of the same. Fig. 3 is a face view of another form of the calendar, the members being pivotally connected, the upper member hiding but a small portion of the lower member. Fig. 4 is a central cross-sectional view of the same. Fig. 5 is a face view of another form of the calendar, the members being slidably connected, a portion of the lower member being exposed. Fig. 6 is a central longitudinal sectional view of the same. Fig. 7 is a face view of another form of the calendar, differing from that disclosed in Fig. 5, in that both sides of the lower member are adapted for use, said member having a portion of the data located on its opposite sides adapted to operate in connection with data placed on the upper member. Fig. 8 is a face view of the opposite side of the lower member shown in Fig. 7. Fig. 9 is a side elevation of a pencil-tip having the calendar arranged thereon. Fig. 10 is a view, diagrammatic in its nature, of the construction shown in Fig. 9 to show the manner in which the calendar is arranged on the parts. Fig. 11 is a face view showing a modified arrangement of parts of the data, including the use of but the last two figures of each year in a century, the century being indicated at one point, and also by providing but a portion of the months in the independent series of months for corresponding with leap-year. Fig. 12 is a central sectional view of the construction shown in Fig. 11.

Different forms of calendars of this class have been heretofore provided; but in each of these disadvantages appear mostly due to the multiplicity of members and the requirements of calculations being made. In some forms it is required to make use of a key in order that the device may be readily used. These are disadvantageous, by reason of the fact that any requirement of calculation or substitution (as in the use of a key) tends to make the device difficult to understand, tends to lead to errors, &c., which cannot be readily detected, in addition to which a great deal of time must be spent in deciphering the mechanism to obtain the proper result. In the present invention, of which six different forms are presented in the drawings, all of which have substantially the same general arrangement, differing only in the manner of connection and the shape of the members, and in the case of the form shown in Figs. 11 and 12, in which the arrangement of the periods differs somewhat to a certain extent, as hereinafter set forth, there are provided but two members, movable relatively to each other, each member being so arranged that when the proper year and month are brought into alinement, either radially or horizontally, the proper day of the week is shown in alinement with the days of the months, but one movement of the members being required, and as the years are arranged in sequential order, the months being practically arranged in the same order and manner, there is no requirement of unnecessary delay in bringing the proper year and month in alinement. In addition to this, the year, month, days of the month, and days of the week being in alinement and all visible it will be plainly apparent that the liability of errors being made is rendered nugatory. By giving the leap-years a distinctive designation without removing them from their proper position in the sequence of years and forming a separate series of months possessing the same distinction, said series coöperating solely with the leap-years, prevents any liability of errors being made when determining dates in leap-years, this being the point where the greatest liability of mistakes being made is located. The arrangement of the years in sequential order and the proper relation of the numerals form periods, generally of four years each, each period having a leap-year, the arrangement being such that a leap-year either begins a period, as shown in Fig. 11, or forms the termination of a period, as shown in the remaining five forms of device. These periods are arranged in sequential or successive order, as will be readily seen by the illustrations, so that it is necessary only to follow the numbers in their regular order to find the proper year. As above stated, those periods are arranged generally in periods of four years each, but as each of the centuries given—"1800" and "1900"—are not leap-years, although holding the position of the ordinary leap-year, the forming of separate periods where these numbers begin or end the regular period of four years is not possible, and hence the periods in which these numerals are found are formed substantially of eight years.

In the drawings, 1 designates the upper or face member, and 2 the lower or inner member. These are mounted to move relatively to each other either pivotally, as shown in Figs. 1, 3, and 11, or slidably, as shown in Figs. 5, 7, and 9, the face member in the latter construction being arranged in cylindrical form, practically sliding over the lower member in a rotary direction. In each of these forms the face member carries the days of the month, together with the months, the latter being arranged in two independent series having distinctive designations corresponding to the designations of the years and leap-years. The two members are arranged in such manner that when the proper month and year are brought in alinement, the years and the days of the week being carried by the lower or inner member, the days of the month will be in proper alinement with the days of the week upon which said days of the month will fall, the year, month, days of the month, and days of the week which are being sought for or used being visible, thus rendering the making of errors impossible. In order that these parts may be visible at this time, the face member 1 may be arranged with openings 3, adapted to expose the years in juxtaposition to the months and to expose the days of the week in juxtaposition to the days of the month, as shown in Figs. 1, 5, 7, and 11; but other means may be provided, such as shown in Fig. 3 or in Fig. 9, the former construction having all of the portions exposed with the exception of a portion of the years, while in the latter construction all of the parts are exposed.

In placing the years in position they are arranged substantially in periods of four years each, (with the exception heretofore noted,) the periods following each other so that the years are arranged in sequential order. This is advantageous, in view of the fact that each period begins or terminates a leap-year, and the fact that a practically-blank space is formed in juxtaposition to the leap-year causes this year to stand out prominently. By thus arranging the years, however, I am able to retain the sequential order, which would not be the case were the arrangement of years continuous without being divided into periods, as shown. The leap-years, however, are made more distinctive from the common years by the use either of different styles of lettering, different colors of ink, or by having them arranged "upside down," as shown in Figs. 9 and 10, it being understood, of course, that whatever distinctive designation is used the months adapted to be used and coöperating with the leap-years will possess the same distinctive designation or feature. The common years and their respective months also possess similar distinctive designations. In this manner the moment the desired year is found, whether common or leap year, the user will know which series of months are to be used therewith.

The arrangement of months differs somewhat in the calendar shown in Fig. 11, in that instead of making two entirely distinct series of months, one for the common years and on for the leap-years, only the two months, "January" and "February," are shown in duplicate, the remaining months being used with both common and leap year. In this arrangement I also place at the head of the opening in which the years are exposed the century numbers, the last two numbers of the years only being carried on the inner member, making a less-confusing calendar.

In the drawings, I have indicated the leap-years and their respective series of months by horizontal lines, this serving to indicate that some distinctive method of indicating the leap-years is used, as hereinbefore set forth.

The operation of the device is exceedingly simple and is believed to have been pointed out with sufficient clearness in the above description, it consisting entirely in bringing the desired year and month into alinement. When this is done, the days of the month and of the week will be found in proper relation to each other.

The advantages consist, among other things, in the simplicity and efficiency of operation, its low cost of manufacture, the non-liability of the parts becoming inoperative, and the arrangement of parts relatively to each other, so that a minimum amount of labor and time is required in acquiring the information desired.

As shown in the drawings, the calendar, when arranged to have a slidable movement, should be constructed with a back portion or the face member should have an opening within which the inner member may have a true movement. This is also true in the construction shown in Figs. 11 and 12, wherein a back portion is shown, forming a space between the front member 1 and its back portion, between which the portion 2 is adapted to rotate.

I have in practice constructed the calendars of heavy pasteboard, the years, &c., being printed thereon; but it is to be understood that other material which is suitable may be used, and especially as in connection with the construction of the pencil-tip, where the parts may be composed of metal.

Having thus described my invention, what I claim as new is—

1. A calendar of the character described, comprising two members mounted to have a movement relative to each other, one of said members carrying the years and the days of the week, the other member carrying the days of the month and a plurality of series of months, one of said series being adapted to be used solely in connection with leap-years substantially as described.

2. A calendar, comprising two members mounted to have a movement relative to each other, one of said members carrying the years arranged in sequential order and the days of the week, the other member carrying the days of the month and a plurality of series of months, one of said series being adapted to be used solely in connection with leap-years, substantially as described.

3. A calendar, comprising two members mounted to have a movement relative to each other, one of said members carrying the years arranged in periods of substantially four years each, each period having a leap-year at one end thereof, each leap-year having a distinctive designation, said years and periods being in sequential order, said member also carrying the days of the week, the other member carrying a plurality of series of months, one of said series having the same distinctive designation as said leap-years and coöperating solely therewith and also carrying the days of the month, substantially as described.

4. In a calendar of the class described, the combination of a series of years arranged in sequential order, said series having the leap-years of a distinctive designation; and a plurality of series of months, one of said series having the same distinctive feature as the leap-years, said series being adapted to coöperate solely with said leap-years, substantially as described.

In witness whereof I have hereunto set my hand in the presence of two witnesses.

ADOLF ZACHRISSON.

Witnesses:
 ROY C. MURPHY,
 THOS. LAWSON.